United States Patent
Krank et al.

(10) Patent No.: US 12,206,293 B2
(45) Date of Patent: Jan. 21, 2025

(54) LIQUID-COOLED ROTOR FOR AN ELECTROMECHANICAL ENERGY CONVERTER

(71) Applicant: Bayerische Motoren Werke Aktiengesellschaft, Munich (DE)

(72) Inventors: Benjamin Krank, Munich (DE); Florian Puschmann, Tauberfeld (DE); Simon Strasinsky, Neufahrn bei Freising (DE); Bernhard Wolf, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 223 days.

(21) Appl. No.: 17/802,028

(22) PCT Filed: Feb. 24, 2021

(86) PCT No.: PCT/EP2021/054483
§ 371 (c)(1),
(2) Date: Aug. 24, 2022

(87) PCT Pub. No.: WO2021/185542
PCT Pub. Date: Sep. 23, 2021

(65) Prior Publication Data
US 2023/0105191 A1    Apr. 6, 2023

(30) Foreign Application Priority Data
Mar. 19, 2020    (DE) .................. 10 2020 107 533.2

(51) Int. Cl.
*H02K 1/32*    (2006.01)
*H02K 7/116*    (2006.01)
*H02K 9/197*    (2006.01)

(52) U.S. Cl.
CPC ............... *H02K 1/32* (2013.01); *H02K 7/116* (2013.01); *H02K 9/197* (2013.01)

(58) Field of Classification Search
CPC ........... H02K 1/32; H02K 7/116; H02K 9/197
See application file for complete search history.

(56) References Cited

U.S. PATENT DOCUMENTS 5,589,720 A * 12/1996 Berger .................. H02K 9/197
310/61
9,712,021 B2    7/2017 Watanabe et al.
(Continued)

FOREIGN PATENT DOCUMENTS

DE    10 2011 078 784 A1    1/2013
DE    10 2016 218 823 A1    3/2018
(Continued)

OTHER PUBLICATIONS

International Search Report (PCT/ISA/210) issued in PCT Application No. PCT/EP2021/054483 dated May 19, 2021 with English translation (seven (7) pages).
(Continued)

*Primary Examiner* — Tulsidas C Patel
*Assistant Examiner* — Mohammed Ahmed Qureshi
(74) *Attorney, Agent, or Firm* — Crowell & Moring LLP

(57) ABSTRACT

A liquid-cooled rotor for an electromechanical energy converter has a rotor shaft designed, at least in portions, as a hollow shaft and having a first, open axial end, a liquid-guiding device extending through the first end into the rotor shaft, wherein an annular liquid space is between the liquid-guiding device and the rotor shaft in the radial direction, and the liquid-guiding device has an interior space for guiding liquid and a liquid inlet opening into the interior space and arranged at a first axial end of the liquid-guiding device, the liquid-guiding device, at a second axial end, is received in
(Continued)

the rotor shaft and guiding relative to the rotor shaft, and has a liquid outlet opening fluidically connecting the interior space to the annular liquid space, and the liquid outlet opening is between the first and second ends of the liquid-guiding device in the axial direction.

10 Claims, 6 Drawing Sheets

(56) References Cited

U.S. PATENT DOCUMENTS

| | | |
|---|---|---|
| 2008/0272661 A1 | 11/2008 | Zhou et al. |
| 2015/0069861 A1 | 3/2015 | Buettner et al. |
| 2020/0036249 A1 | 1/2020 | Krais et al. |

FOREIGN PATENT DOCUMENTS

| | | |
|---|---|---|
| DE | 10 2018 118 275 A1 | 1/2020 |
| EP | 2 541 737 A2 | 1/2013 |
| EP | 3 293 495 A1 | 3/2018 |
| JP | 2017-52335 A | 3/2017 |
| WO | WO 94/06196 A1 | 3/1994 |

OTHER PUBLICATIONS

German-language Written Opinion (PCT/ISA/237) issued in PCT Application No. PCT/EP2021/054483 dated May 19, 2021 (six (6) pages).

German-language Search Report issued in German Application No. 10 2020 107 533.2 dated Feb. 4, 2021 with partial English translation (14 pages).

* cited by examiner

LIQUID-COOLED ROTOR FOR AN ELECTROMECHANICAL ENERGY CONVERTER

BACKGROUND AND SUMMARY

The invention relates to a liquid-cooled rotor for an electromechanical energy converter. DE 10 2016 218 823 A1 deals with a cooling system for an electromechanical machine and is thus in the same technical field as a subject according to the present disclosure. US 2008/0272661 A1 deals with a liquid-cooled rotor device.

In the following, the invention is described with reference to an electric motor in a motor vehicle, however, this is not to be understood as limiting the invention to this application. For mobile applications, such as in motor vehicles, it is an objective to achieve a high power density of the electric motor. To achieve the highest possible power density, the rotor in the electric motor is actively cooled, for example by means of a water lance or oil lance. This is particularly important for asynchronous machines and separately-excited synchronous machines. Insufficient cooling leads to premature degradation of the drive. A water lance requires a complex mechanical seal of the cooling channel at the rotor inlet. As an alternative to water lance cooling, the rotor can be cooled by oil cooling using transmission oil. An oil pump is provided to generate the cooling oil flow through the rotor, but a mechanical oil pump exhibits a power loss that increases with speed, which can have a detrimental effect on the efficiency of the drive. Furthermore, an oil pump regularly requires an electrical pump control, which can increase the susceptibility to faults and thus can have a detrimental effect on the reliability of the system.

It is an object of the invention to provide a liquid-cooled rotor of an electromechanical energy converter having improved operating characteristics and an electromechanical energy converter comprising such a rotor, this object being solved by a subject according to the present disclosure, with developments of the invention that are to be preferred also being the subject of the present disclosure.

For the purposes of the invention, a liquid-cooled rotor for an electromechanical energy converter means a rotor for use in an electric motor, an electric generator or an electric motor/generator, which can be temperature-controlled and in particular can be cooled with a liquid medium. Preferably, the liquid used for temperature control is a lubricant and preferably an engine or transmission oil. Depending on the design of the electromechanical energy converter, the rotor is designed as an electrically passive or active element, wherein the invention can find application regardless of this characteristic. The liquid-cooled rotor has a rotor shaft which, in the case of motor operation, is designed to output drive power and, in the case of generator operation, is designed to receive drive power (torque, speed) and which is mounted rotatably about a rotor axis. Furthermore, this rotor shaft is designed at least in portions as a hollow shaft and has a first, open axial end. In addition, the liquid-cooled rotor has a liquid-guiding device, wherein the liquid-guiding device is set up for guiding liquid which is provided for controlling the temperature of the rotor.

This liquid-guiding device extends through this first, open axial end of the rotor shaft into its hollow shaft portion. Figuratively speaking, the rotor shaft and the liquid-guiding device form, at least in portions, two tubular components inserted one into the other, wherein the rotor shaft surrounds the liquid-guiding device. Preferably, the rotor shaft and the liquid-guiding device are connected to one another in an integrally bonded manner and are preferably designed in one piece.

In the radial direction, a liquid annulus space is formed between the liquid-guiding device and the rotor shaft, at least in portions. Functionally, this opens up the possibility of guiding liquid through the liquid-guiding device (radially inner tube component) into the rotor shaft and guiding this liquid out of the rotor shaft again via the annular gap formed in portions between the rotor shaft and the liquid-guiding device, the so-called liquid annulus space. For forming this functionality, the liquid-guiding device has an interior for guiding liquid and a liquid inlet opening in this interior, wherein this liquid inlet opening is arranged at a first axial end of the liquid-guiding device.

The liquid-guiding device extends along the rotor axis in the axial direction up to its second axial end. This second axial end of the liquid-guiding device is therefore opposite its first axial end.

The liquid-guiding device is accommodated in the rotor shaft indirectly or directly, in particular at or with the second axial end of the liquid-guiding device. In a preferred embodiment, the rotor shaft has a rotor shaft end piece with which it is preferably terminated. Further preferably, the rotor shaft end piece is accommodated in or on the rotor shaft and further preferably the rotor shaft end piece is designed in one piece with the rotor shaft or is preferably connected thereto.

In a further preferred embodiment, the liquid-guiding device is accommodated with its second axial end in this rotor shaft end piece and thus the liquid-guiding device is accommodated indirectly with respect to the rotor shaft at least in the region of its second axial end. In particular, such a design enables a modular structure of the rotor shaft with rotor shaft end piece and liquid-guiding device. Further preferably, the liquid-guiding device is accommodated at its second axial end in the rotor shaft end piece in such a way that the liquid-guiding device is sealed off in a liquid-tight manner at this end.

In a further preferred embodiment, the liquid-guiding device has a support portion at its second axial end. Preferably, the support portion is to be understood as a portion of the liquid-guiding device which extends radially outwardly, preferably starting from the second axial end of the liquid-guiding device, through the liquid annulus space formed between the liquid-guiding device and the rotor shaft. Further preferably, the liquid-guiding device is supported via this support portion, in particular in the region of the second axial end of the liquid-guiding device, relative to the rotor shaft and is preferably centered relative to the latter. In particular by means of the support portion, the liquid-guiding device is directly received relative to the rotor shaft. In particular, by means of a support portion, direct and thus precise centering of the liquid-guiding device in the rotor shaft is made possible. In a preferred embodiment, the support portion closes off the liquid interior of the liquid-guiding device in a liquid-tight manner with respect to the liquid annulus space. In particular, by means of such an embodiment, it is achievable that liquid from the liquid interior enters the liquid annulus space only through one or more liquid outlet openings and thus a precise metering of a liquid flow into the liquid annulus space is possible.

In a further preferred embodiment, the support portion has at least one or more support portion recesses through which the liquid annulus space is fluidically connected to the liquid interior of the liquid-guiding device. In particular, by means of at least one such support portion recess, a liquid flow from the second axial end of the liquid-guiding device into the liquid annulus space is made possible. In particular, the at least one support portion recess, or the size thereof, is matched to the liquid outlet opening, or the size thereof, so that a certain resulting flow of the liquid through the liquid annulus space is predefined by this matching.

Furthermore, the liquid-guiding device is accommodated in the region of, or with, its second axial end, in a rotor shaft end piece. Preferably, this rotor shaft end piece is designed in one piece with the rotor shaft or is connected to it as a separate component. Further preferably, the liquid-guiding device is centered with the shaft end piece relative to the rotor shaft and further preferably relative to the axis of rotation. Further preferably, the rotor shaft end piece results in the preferably radially more uniformly extending liquid annulus space.

And further, the liquid-guiding device has at least one liquid outlet opening, preferably a plurality of liquid outlet openings. Such a liquid outlet opening is to be understood here in particular as a recess in the liquid-guiding device, through which the interior of the liquid-guiding device is fluidically connected to the liquid annulus space. Further, the at least one liquid outlet opening and preferably all liquid outlet openings are arranged in the axial direction between the first and the second end of the liquid-guiding device. In particular, the possibility of the "free" positioning of the liquid outlet opening, in particular in the axial direction, against an outlet of the liquid through an axial end of the liquid-guiding device, as this is known from the prior art, provides a simple possibility to guide the liquid out of the liquid-guiding device at the point of need and thus to achieve improved cooling and thereby improved operating behavior. Further preferably, a plurality of liquid outlet openings are provided and preferably these are arranged spaced from one another in the axial direction, that is to say along the axis of rotation.

In a preferred embodiment, the liquid-guiding device has a liquid guide tube and an output shaft component. In particular, by assembling the liquid-guiding device from a plurality of components, it is possible to design the liquid-guiding device in a manner tailored to meet the requirements. Preferably, the output shaft component is connected to the rotor shaft for conjoint rotation and preferably the output shaft component has at least one bearing seat for receiving a bearing device for rotatably supporting the rotor shaft. Further preferably, the output shaft component is completely designed as a hollow shaft component.

Further preferably, the liquid inlet opening is arranged at a first axial end of the output shaft component and the liquid guide tube is arranged at a second axial end of the output shaft component, in particular opposite the first. Preferably, the liquid guide tube is thus arranged with a first axial end at the second axial end of the output shaft component. Preferably, the liquid guide tube is received with a second axial end at the rotor shaft end piece and this second axial end of the liquid guide tube thus forms the second axial end of the liquid-guiding device. Preferably, this second axial end of the liquid guide tube is not arranged in the rotor shaft end piece but preferably the support portion is arranged at this second axial end of the liquid guide tube and further preferably the second axial end of the liquid guide tube thus forms the second axial end of the liquid-guiding device. Preferably, the liquid guide tube is widened in a funnel-like manner in the region of the support portion and, further preferably, this widened region of the liquid guide tube is supported relative to the rotor shaft, so that the liquid guide tube is received directly in the rotor shaft in the region of its second axial end.

Further preferably, the liquid guide tube, in particular without considering the support portion, is designed as an at least substantially cylindrical component, preferably as a circular-ring-cylindrical component. Preferably, the at least one liquid outlet opening extends radially outwardly through a wall of the liquid guide tube, wherein this wall is to be understood quasi as a lateral surface of the liquid guide tube. As explained, the at least two-part design of the liquid-guiding device results in particular in the possibility of a design thereof that is tailored to meet the requirements.

In a preferred embodiment, the liquid-guiding device and preferably the output shaft component are received in the rotor shaft in a rotor connection region. Preferably, at least one liquid-guiding channel is arranged in this rotor connection region and is to be understood as a free space arranged radially between the rotor shaft and the liquid-guiding device. Preferably, the liquid-cooled rotor has multiple liquid-guiding channels of this kind. In particular, the at least one liquid-guiding channel is designed in such a way that the liquid annulus space (intermediate space between the rotor shaft and the liquid-guiding device, in particular in the region of the liquid guide tube) is fluidically connected by way of the liquid-guiding channel to the environment surrounding the liquid-cooled rotor. Due to the design of an electrical machine in which this liquid-cooled rotor is used, this environment surrounding the rotor can be a housing interior. In particular, such a rotor connection region between the liquid-guiding device and the rotor shaft enables a simple discharge of liquid from the liquid annulus space and thus an improved cooling effect is achievable.

In a preferred embodiment, the rotor connection region has at least one torque transmission region and at least one centering region. In particular, by such a design, the centering is functionally separated from the torque transmission and a centering with high accuracy and a torque transmission (from the rotor shaft to the liquid-guiding device in particular the output shaft component) is possible. Preferably, the torque transmission region and the centering region are spaced apart from one another in the axial direction. Further preferably, the torque transmission region is designed as a shaft-hub connection with an interlocking connection. Preferably, this shaft-hub connection has splines that mesh with one another, wherein a tooth tip clearance is preferably provided in these splines, so that the liquid-guiding channel is formed in this region by this tooth tip clearance.

Further preferably, a recess is arranged in the centering region to form the liquid-guiding channel. Preferably, the centering region is designed as a shaft portion on the liquid-guiding device, and a bore or recess portion in the rotor shaft, wherein the shaft portion with the bore portion has the corresponding centering functionality for the rotor connection region. Preferably, a recess in this sense is to be understood in particular as a flattening or flat spot, and further a recess is to be understood as a groove-like recess in the rotor shaft or in the liquid-guiding device in the centering region. In particular, by such a design of the liquid-guiding channel, a high accuracy with the centering region and a good torque transmissibility with the torque transmission region can be achieved, and further, thus a low installation space requirement for the liquid-guiding channel through the rotor connection region is achievable.

Furthermore, an electromechanical energy converter with a liquid-cooled rotor in one of the previously explained designs is proposed. In such an electromechanical energy converter, the rotor shaft is rotatably mounted in a housing device. Further, an energy converter rotor is connected to the rotor shaft for conjoint rotation, this rotor may have one or more windings or other magnetic or non-magnetic components, depending on the design of the electromechanical energy converter, wherein the invention is applicable regardless of the design of the rotor. Further, an output pinion is arranged on the rotor shaft and is preferably set up to transmit drive power in the form of speed and torque from the rotor shaft or to the rotor shaft. Preferably, the output pinion is arranged on the liquid-guiding device and preferably on the output shaft component and preferably the output pinion is connected in one piece to the output shaft component.

Furthermore, an electromechanical energy converter with a liquid-cooled rotor according to one of the previously explained embodiments is proposed. The liquid-cooled rotor is rotatably mounted in a housing device (0). In particular, this rotor has a preferred direction of rotation, in particular this preferred direction of rotation in a motor vehicle is the direction of rotation which results for forward travel. Further, an energy converter rotor is connected to the rotor shaft for conjoint rotation. For the purposes of the invention, the energy converter rotor means the region of the rotor which is set up on the rotor shaft to generate the drive power (speed, torque) which can be output by the electromechanical energy converter by means of the rotor shaft.

Furthermore, an output pinion is arranged on the liquid-cooled rotor, wherein this output pinion meshes with a mating gear for power transmission. This mating gear is surrounded in the radial direction, or in the circumferential direction, at least in portions by a liquid collection portion of a liquid supply device. The liquid collection portion is thus delimited at least in portions by a circumference, or a circumferential surface, of the mating gear. Preferably, the liquid collection portion is designed such that the mating gear is immersed in liquid received in the liquid collection portion. Further preferably, the liquid receiving portion is arranged such that at least one tangent to the circumference of the mating gear, in the region of the liquid receiving portion, extends in the direction of the first axial end of the liquid-guiding device. In particular, the direction of the tangent is to be understood here in such a way that this tangent is projected in a plane which runs through the first axial end of the liquid-guiding device and which is arranged orthogonally to the axis of rotation, and that the tangent runs in this plane in the direction of the first axial end of the liquid-guiding device.

Turned the other way, with the mating gear, preferably in the preferred direction of rotation, a liquid flow can be generated from the liquid collection portion towards the liquid inlet opening arranged in the first axial end of the liquid-guiding device. In particular, by means of such an embodiment of the invention, in normal operation of the electromechanical energy converter, in a direction of rotation of the mating gear, preferably in the preferred direction of rotation, it is possible to convey liquid from the liquid collection portion in a purposefully directed manner to the liquid inlet opening and thus, in particular, to ensure efficient cooling of the liquid-cooled rotor.

In a preferred embodiment of the invention, in the normal installation position of the electromechanical energy converter, the output pinion is covered in the axial direction at least in portions by a liquid supply device, at least in portions or preferably completely. Preferably, this liquid supply device has a liquid collection portion which, in this normal installation position, is arranged at least in portions above the output pinion, so that, during normal operation of the electromechanical energy converter, in which the output pinion rotates about the axis of rotation, liquid thrown upwards by the output pinion or another gear is at least partially collected by the liquid collection portion. Wherein, also in this context, the directional indication "upward" refers to the normal installation position of the electromechanical energy converter. In particular, by this embodiment, it is possible to catch liquid thrown upwards from the output pinion with the liquid collection portion and to let it run to a predefined location automatically, in particular, that is, without a pumping device, under the weight of the liquid. In particular, the liquid transport at the liquid supply device takes place without pressure and preferably exclusively under weight force. In particular, such a design of the electromechanical energy converter enables an automatic liquid movement for rotor cooling, especially without additional energy input.

In a preferred embodiment of the invention, a radially circumferential and radially inwardly projecting accumulation portion is formed at the liquid inlet opening. Preferably, this accumulation portion is to be understood as a radial taper, preferably at the liquid inlet opening. In particular by means of such a bottleneck portion, liquid can flow out of the liquid-guiding device only when a liquid level exceeds the bottleneck portion, as a second possibility liquid exits the liquid-guiding device from the liquid outlet opening. In particular, by means of an accumulation portion, the formation of a preferential flow direction from the liquid inlet opening to the liquid outlet opening is favored in the normal operation of the electromechanical energy converter. In particular, by means of the proposed accumulation portion, the desired flow direction in the liquid-guiding device (from the liquid inlet opening towards the liquid outlet opening) is impressed on the liquid for cooling the liquid-cooled rotor without the need for an additional pumping device.

In a preferred embodiment of the electromechanical energy converter, the liquid supply device comprises a liquid supply portion. Preferably, this liquid supply portion is designed as a raised portion of the liquid supply device. Preferably, this raised portion extends in an axial direction through, or into, the liquid inlet opening. The liquid supply portion is arranged below the liquid inlet portion in the planar installation position of the electromechanical energy converter, so that liquid collected by the liquid collection portion flows to the liquid supply portion under weight force. Preferably, additional guide members are provided which improve a purposefully directed flow of liquid from the liquid collection portion to the liquid supply portion. In particular, such an embodiment enables a pumpless flow from the liquid collection portion to the liquid supply portion.

In a preferred embodiment, the liquid supply portion extends in the axial direction through the liquid inlet opening and across the accumulation portion into the interior of the liquid-guiding device. In particular, by means of such an embodiment, a particularly large amount of liquid collected in the liquid collection portion is utilized for cooling the rotor because it is deposited downstream of the accumulation portion in the preferred flow direction.

Further preferably, the liquid supply portion is not introduced into the liquid inlet opening in a liquid-tight manner. In particular, in rotor cooling systems known from the prior art that feed pressurized liquid into the rotor, the liquid path is designed to be liquid-tight, since otherwise leakages occur and secondary streams of the liquid form. In known systems, liquid-tightness at the transition into the rotatably mounted rotor from the stationary liquid supply is established at this transition with a sealing device that is partly complex and partly in contact with the rotor. The invention preferably proposes an open system at this transition, in which an open region remains in the inlet opening adjacent to the liquid supply portion. Figuratively speaking, in such an embodiment, the liquid supply portion does not completely fill the liquid inlet opening. In particular, such a design makes it possible to achieve a simple structure and a high degree of efficiency, since a sealing device between the liquid supply portion and the liquid inlet opening can be omitted or can be of only rudimentary design, preferably in the form of a wiper ring or the like, and thus only slight or no sealing losses occur at this point.

In the following, individual features of the invention as well as embodiments thereof are explained in more detail with reference to the figures.

DETAILED DESCRIPTION

Figure 1:
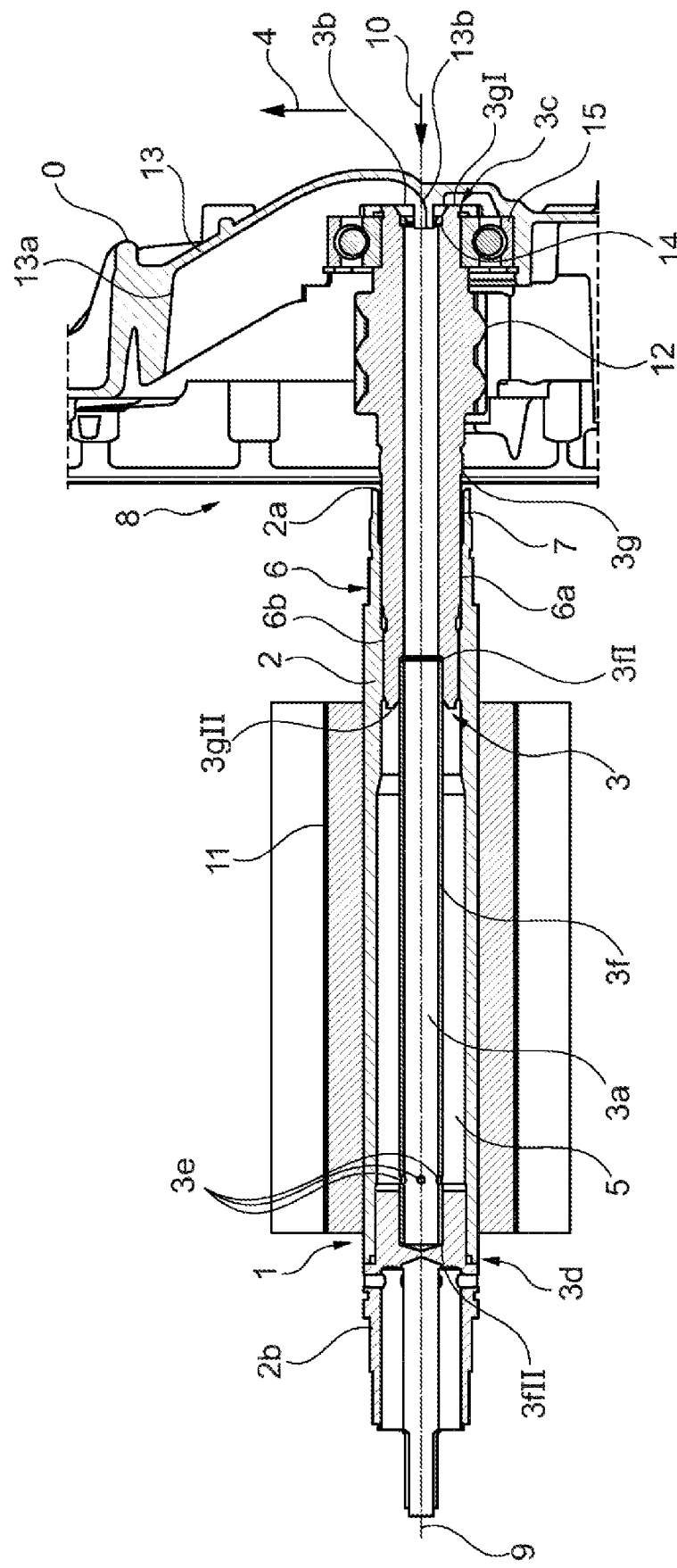
FIG. 1 shows a partial longitudinal section through an electromechanical energy converter with liquid-cooled rotor.
Figure 2:
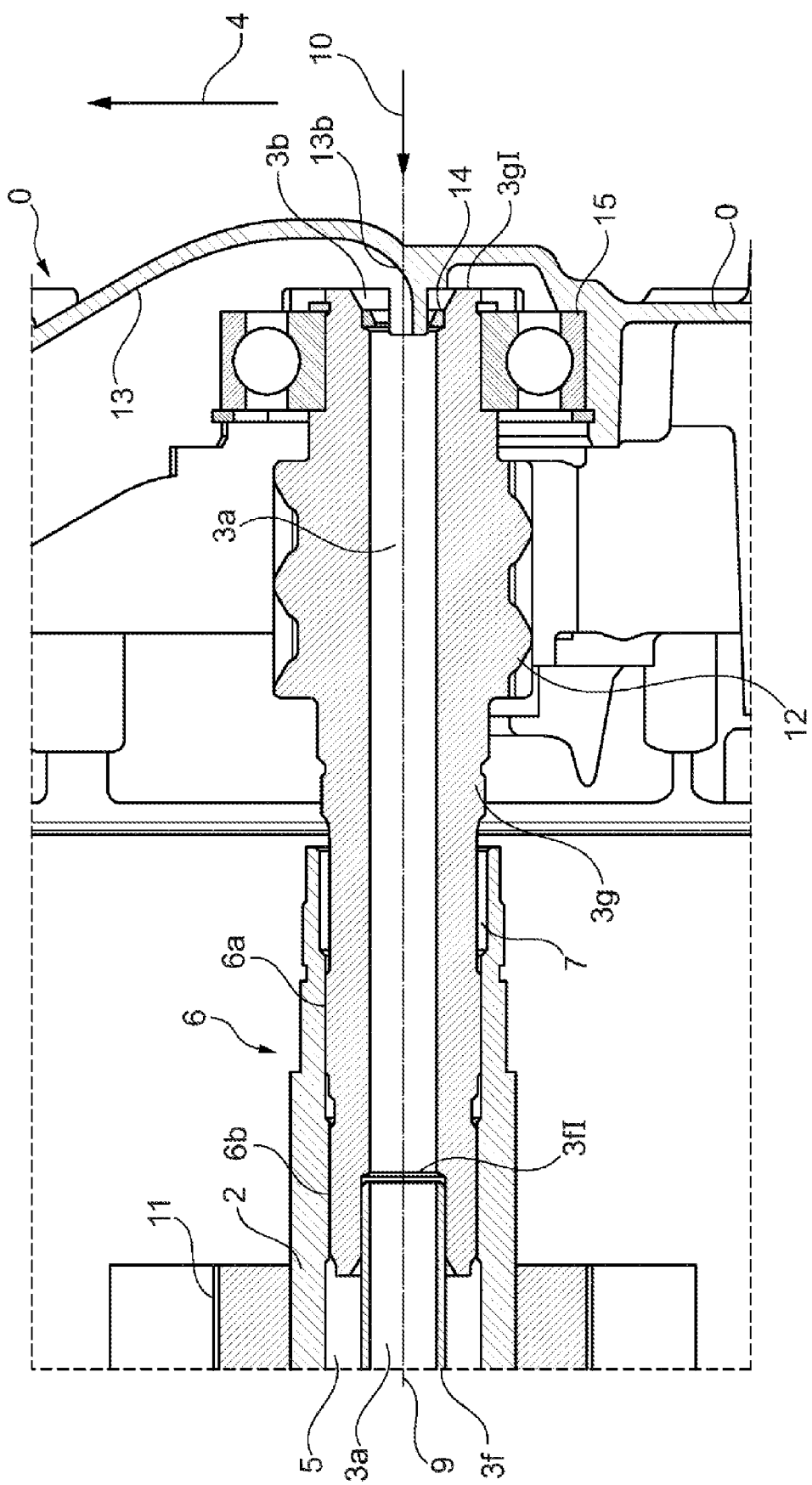
FIG. 2 shows a partial longitudinal section in the region of the output shaft with output pinion of the liquid-cooled rotor.

FIG. 1 shows a partial longitudinal section through an electromechanical energy converter with a liquid-cooled rotor 1, and FIG. 2 shows an enlarged view of the same embodiment, in particular of the output shaft component 3g. This liquid-cooled rotor 1 has a multi-part design, the main components of which are the rotor shaft 2, which guides the energy converter rotor 11 and rotatably supports it about the rotor axis 9, and the liquid-guiding device 3, which in turn has the output shaft component 3g and the liquid guide tube 3f as components.

The liquid guide tube 3f is received with its first axial end 3fI in the second axial end 3gII of the output shaft component 3g, and with its second axial end 3fII the liquid guide tube 3f is received in the rotor shaft end piece 2b of the rotor shaft 2. The liquid guide tube 3f can be understood as a so-called oil lance. The rotor shaft end piece 2b closes off the second axial end 3fII of the liquid guide tube 3f and positions the liquid guide tube 3f in this region relative to the rotor shaft 2. The liquid guide tube 3f has a plurality of liquid discharge openings 3e in its tube wall, which are spaced apart from both the first axial end 3fI and the second axial end 3fII of the liquid guide tube 3f in the axial direction 10. In this multi-part embodiment of the liquid-guiding device 3 (output shaft component 3g, liquid guide tube 3f), the second axial end 3d of the liquid-guiding device 3 and the second axial end 3fII of the liquid guide tube 3f coincide or correspond to one another, and the same applies to the first axial end 3b of the liquid-guiding device 3 and the first axial end 3gI of the output shaft component 3g.

The liquid-cooled rotor 1 is mounted in the housing device 0 so as to be rotatable about the axis of rotation 9, in particular via the deep groove ball bearing 15, and the radial direction 4 is formed orthogonally to the axis of rotation 9.

In normal operation of the electromechanical energy converter, it outputs drive power (speed, torque) to a further gear (not shown) via the output pinion 12, which is designed in one piece with the output shaft component 3g. The gear stage (output pinion 12, further gear) is oil-lubricated. Due to the rotational movement of the output pinion and/or the further gear, oil is thrown off them. This thrown-off oil is at least partially collected by the liquid supply device 13. For this purpose, the liquid supply device 13 has the liquid collection portion 13a. The liquid collection portion 13a at least partially covers the output pinion 12 in the axial direction 10, and is arranged above the liquid inlet opening 3b in the shown planar installation position (this corresponds to the shown position) of the electromechanical energy converter. Under weight force, the oil collected in the liquid collection portion 13a runs downwards, that is, towards the liquid inlet port 3b. The liquid supply device 13, which may be designed as an end shield or a housing component, additionally has a liquid supply portion 13b. The liquid supply portion 13b extends in the axial direction 10 through the liquid inlet opening 3b and the collected oil is thus supplied to the interior 3a of the liquid-guiding device via the liquid supply device 13. As explained, this supply takes place under the effect of weight force and thus without pressure, so that a sealing device at the transition of the rotatably mounted liquid-cooled rotor 1 to the stationary liquid supply device 13, which is fixed to the housing, is superfluous.

At the first axial end 3c, that is to say at the liquid inlet opening 3b, an accumulation portion 14 is formed. The accumulation portion 14 is a radially circumferential and radially inwardly projecting region in the output shaft component and prevents oil from flowing out of the output shaft component against the direction from the liquid inlet opening 3b to the liquid outlet opening 3e. The liquid supply portion 13b projects beyond this accumulation portion 14 in the axial direction 10, so that oil is safely discharged from this liquid supply portion into the interior 3a downstream of the accumulation portion 14.

Due to the rotation of the liquid-cooled rotor 1, the oil introduced via the liquid supply device 13 is discharged from the interior 3a of the liquid guide tube 3f radially outwards through the liquid outlet openings 3e. Thus, due to the centrifugal forces, a preferential direction for the supplied oil from the liquid inlet opening 3b to the liquid outlet opening 3e is formed with respect to the liquid-guiding device 3 in the interior 3a of the latter.

From the liquid outlet 3e, the oil passes under the effect of the centrifugal force in the liquid annulus space 5 between the liquid guide tube 3f and the rotor shaft 2. Through the connection region 6, in which the output shaft component 3g is connected to the rotor shaft 2 by means of a centering region 6a and a torque transmission region 6b, there extends the liquid-guiding channel 7, through which liquid, in this case oil, is discharged from the liquid annulus space 5 into the environment surrounding the liquid-cooled rotor 1. The torque transmission region 6b is designed as a shaft-hub connection with splines. The centering region is designed as a substantially cylindrical shaft or hub portion, wherein the shaft portion has flattened regions which are to be understood as recesses in this sense, so that the liquid-guiding channel 7 runs through the torque transmission region 6b and the centering region 6a on the one hand through the stated locations.

In FIG. 2, it is particularly clearly visible how the liquid supply portion 13b of the liquid supply device 13 extends in the axial direction 10 beyond the accumulation portion 14 into the interior 3a formed inside the output shaft component 3g and the liquid guide tube 3f. Although the accumulation portion 14 extends radially inwardly into this interior 3a, it is spaced apart from the liquid supply portion so that no frictional losses occur between the output shaft component 3g with the accumulation portion 14 and the liquid supply device 13 with the liquid supply portion 13b.

Figure 3:
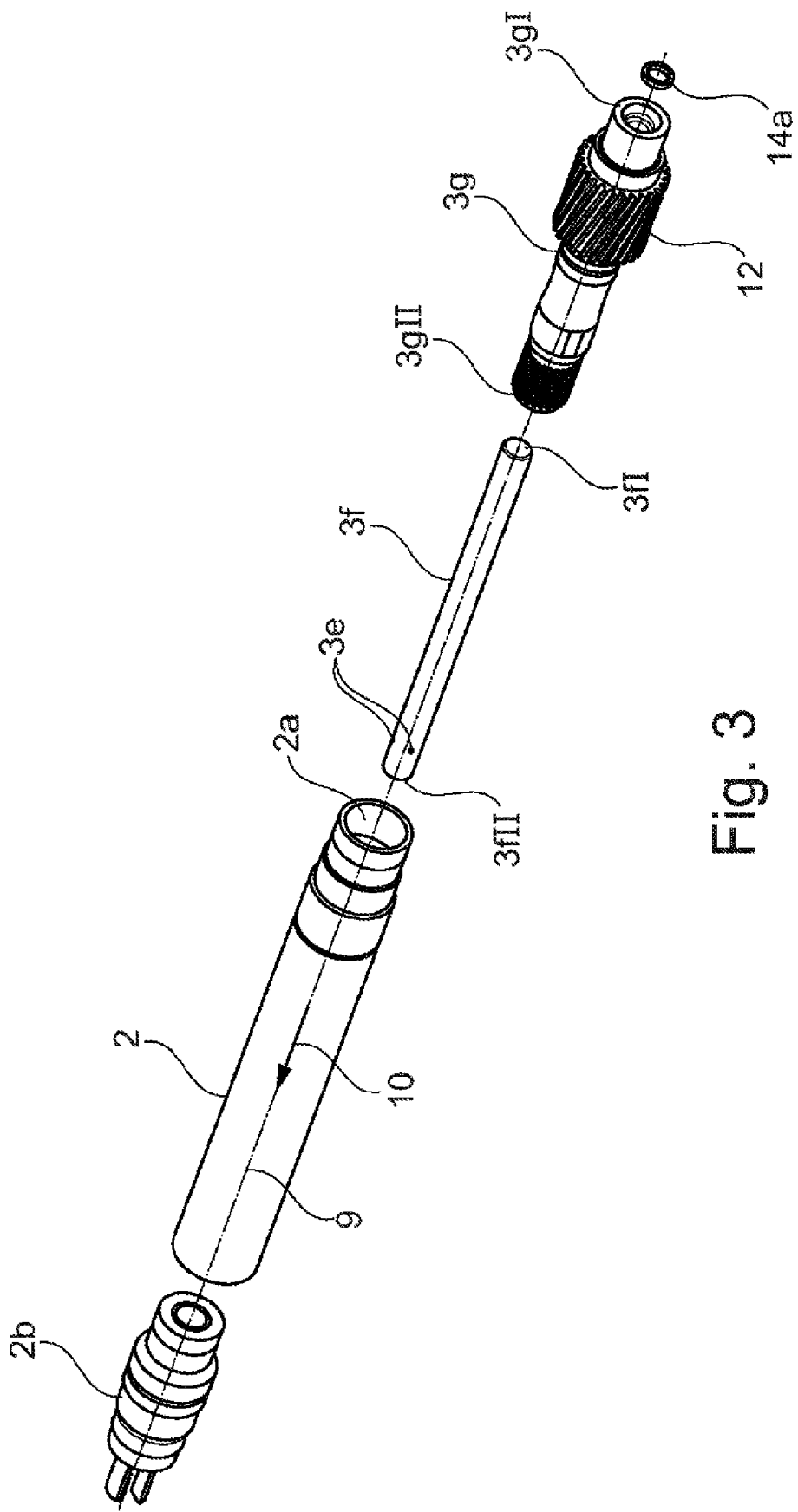
FIG. 3 shows a perspective exploded view of the liquid-cooled rotor.

FIG. 3 shows a perspective exploded view of individual components of the liquid-cooled rotor 1 explained in FIGS. 1 and 2. The rotor shaft end piece 2b can receive a further bearing for rotatably supporting the liquid-cooled rotor 1 and is connected to the rotor shaft 2 in the assembled state. The rotor shaft 2 is designed substantially as a hollow shaft. The liquid guide tube is received with its first axial end 3fI in the output shaft component 3g and with its second axial end 3fII in the rotor shaft end piece 2b. With the two receptacles, the liquid guide tube 3f can be held in a centered manner with respect to the rotor shaft 2 and the axis of rotation 9. The liquid guide tube 3f has the liquid outlet openings 3e, through which liquid guided in the liquid guide tube 3f can exit the latter as normal.

The output shaft component 3g has the output pinion 12, which is designed as a cut spline. With its second axial end 3gII, the output shaft component 3g is inserted into the rotor shaft 2 and connected to it in the connection region. The accumulation portion is formed in the output shaft component 3g by a separate component, namely by the accumulation portion ring 14a to be pressed into the output shaft component 3g at the first axial end 3gI of the latter.

Figure 4:
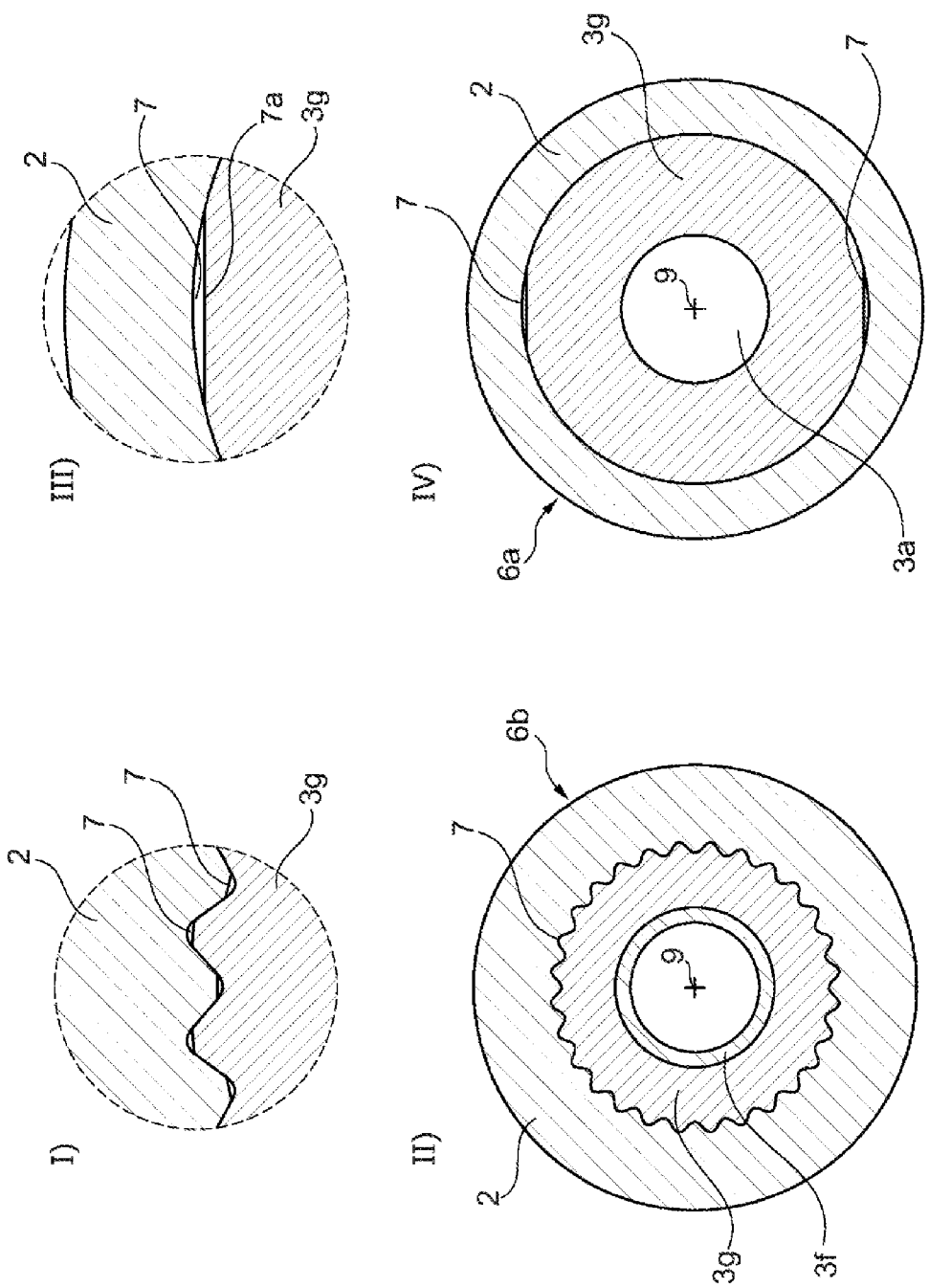
FIG. 4 shows two cross-sections of the liquid-cooled rotor in the connection region.

FIG. 4 shows two cross-sectional views (II, IV), which pass through the connection region at different axial positions, and two enlarged detail views (I, III) from these cross-sectional views (II, IV), with detail view I belonging to cross-sectional view II and detail view III to cross-sectional view IV.

In cross-sectional view II, a cross-section through the torque transmission region 6b is shown, with the axis of rotation 9 cut orthogonally. The liquid guide tube 3f can be seen as an annulus surface. The output shaft component 3g has an external spline which meshes with an internal spline in the rotor shaft 2 to transmit torque. The liquid-guiding channel 7, or a plurality of these channels, is formed in these intermeshing splines (internal spline/external spline). In detail view I for this cross-sectional view II, it can be seen that, with respect to the external spline of the output shaft component 3g, there is a gap at each tooth tip and each tooth base, the gap allowing liquid to flow through the torque transmission region 6b, so that these gaps form the liquid-guiding channel in the torque transmission region 6b.

In cross-sectional view IV, a cross-section through the centering region 6a is shown, with the axis of rotation 9 orthogonally cut here. The output shaft component 3g has a substantially circular outer surface which engages a circular inner surface in the rotor shaft 2 for centering, thereby centering the output shaft component 3g relative to the rotor shaft 2. In these intermeshing surfaces (inner surface/outer surface), the liquid-guiding channel 7, or rather two such channels are formed in the present case by recesses in the outer surface of the output shaft component 3g. In the detail view III for this cross-sectional view IV, it can be seen that the outer surface of the output shaft component 3g is flattened, in particular flattened by a recess. The flattening results in the gap visible in detail view III, which forms the liquid-guiding channel 7 so that liquid can flow through it through the centering region 6a. In other words, the liquid-guiding channel 7 is formed in the centering region 6a by this recess or flattening.

In other words, a cooling concept for a rotor of an electromechanical energy converter requires that loss-generating components of the drive are located in spatial proximity to the gearbox installation space. It is proposed that transmission oil is applied as the liquid for cooling the liquid-cooled rotor. One idea of the proposed concept is to exploit the oil flow in the transmission due to the gear movements in such a way that the oil is conveyed into the liquid-cooled rotor of the electromechanical energy converter without an oil pump, that is to say passively. Components of the proposed invention include, in particular:

1. Oil feed into a rotating hollow shaft region, in particular into the liquid-guiding device, starting from an open axial shaft end.
2. Transport of the oil through the hollow shaft region into which the oil was fed as well as a so-called oil lance, in particular the liquid guide tube, due to centrifugal acceleration.
3. Outflow of the oil from the oil lance, in particular the liquid guide tube, into the radially outer rotor shaft, on which the heat input is generated by the conversion of electrical power (voltage, current) into mechanical power (speed, torque).
4. Return flow of the oil into the transmission chamber, in which the output pinion in particular is located, that is to say into the environment surrounding the liquid-cooled rotor.

The oil supply to the output pinion can be active, that is to say in particular by an electric or mechanical oil pump, but due to efficiency and cost advantages it is generally passive, in particular oil immersion lubrication. The output shaft component 3g is located in the oil chamber of a transmission, whereby transmission oil splashes in the vicinity due to gear movements. The transmission oil that splashes against the end shield, which has the liquid supply device 13, sticks there and flows into the liquid supply portion 13b, which is designed as a drip nose, due to the force of gravity and possibly in combination with oil ducting geometry on the housing side. The output shaft component 3g and the liquid guide tube 3f are designed in the present case as separate components, but can also be designed in one piece with one another.

Due to the rotary motion of the output shaft component 3g with the rotor shaft 2 during normal operation of the electromechanical energy converter and the oil lance guided therein, that is to say the liquid guide tube 3f, there is a high centrifugal force on the radius of the inner wall of the liquid guide tube 3f, which causes the introduced oil to adhere to this inner wall. The resulting axial expansion of the oil causes oil to flow along the output shaft component 3g and liquid guide tube 3f, that is to say, in the interior 3. The accumulation portion 14 at the open shaft end, that is to say in the region of the liquid inlet opening 3b, directly below the drip nose of the liquid supply portion 13b, prevents the oil from flowing back into the transmission chamber, that is to say into the environment 8 surrounding the liquid-cooled rotor 1, so that the oil is conveyed in the axial direction towards the other end of the oil lance, that is to say towards the liquid outlet opening 3e and thus towards the energy converter rotor.

When the oil in the liquid guide tube 3f reaches the liquid outlet opening 3e, the oil from the oil lance (liquid guide tube 3f) sprays into the rotor shaft 2, which is designed as a hollow shaft, and thus enters the liquid annulus space 5. Due to the centrifugal acceleration in the rotating rotor shaft 2, the oil is deposited on the radially outer inner wall of the rotor shaft 2. There, the oil absorbs heat from the energy converter rotor 11 and contributes to its cooling.

In the proposed embodiment, the oil flow passes through the spline of the torque transmission region 6b and fattened portions in the centering region 6a, that is to say through the liquid-guiding channels designed in this way, back into the transmission chamber. The oil is thus conveyed back to the place from which it was previously taken, and this is thus a closed oil circuit.

In this case, this oil flow lubricates, among other things, the spline which may or may not be provided. The rotor shaft 2 and the output shaft component 3g are designed as separate components in the present case; these can also be embodied in one part. In the case of a one-piece design (rotor shaft 2 in one piece with output shaft component 3g), at least one liquid-guiding channel can be formed by a radial recess or bore through this one-piece component, the radial recess leading out of the liquid annulus space back into the environment 8 surrounding the liquid-cooled rotor, that is to say in particular into the transmission chamber.

Figure 5:
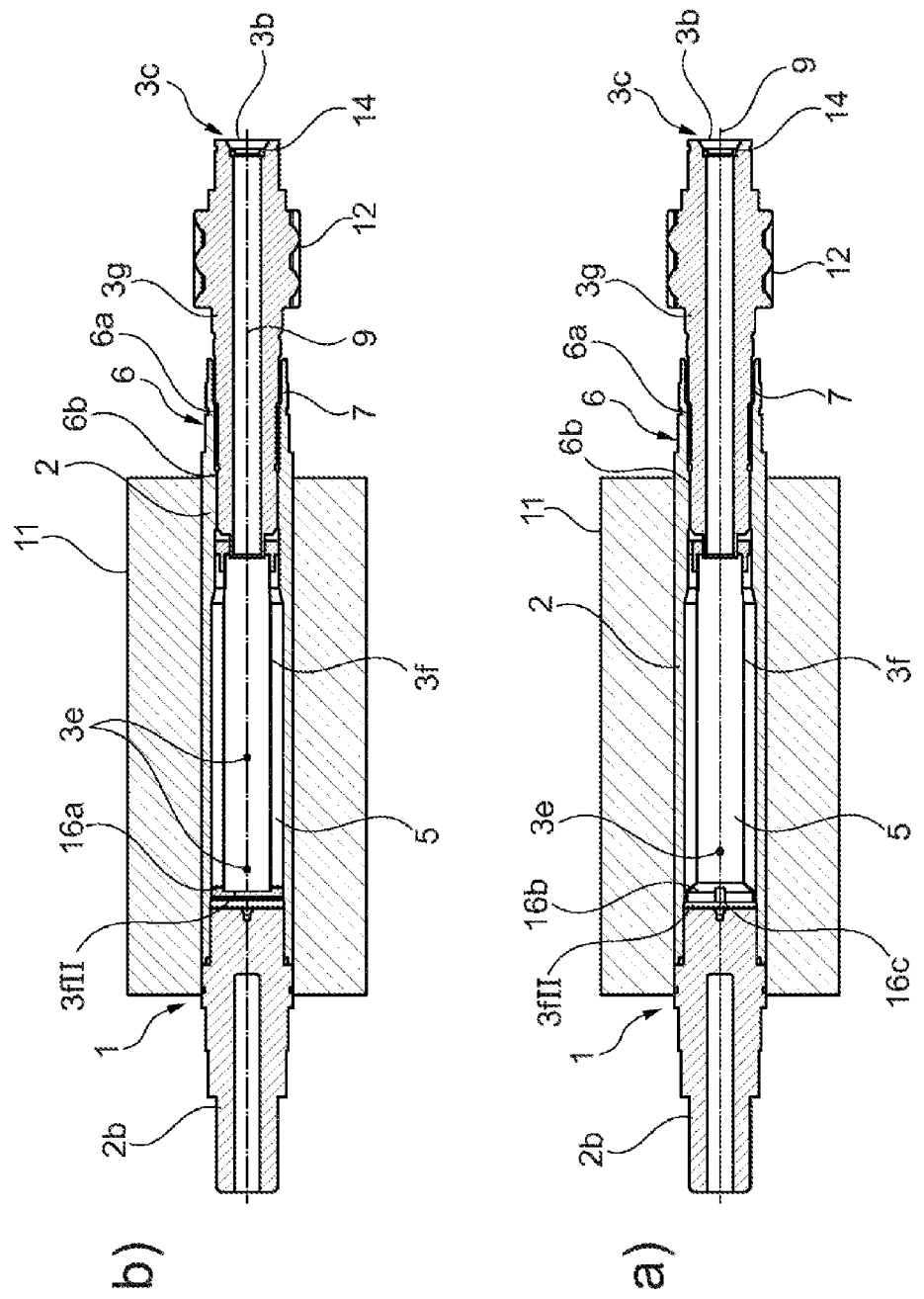
FIG. 5 shows two longitudinal sections of liquid-cooled rotors with support portion.

FIG. 5 shows a first variant FIG. 5a of the liquid-cooled rotor with support portion (fluid-tight support portion) and a second variant FIG. 5b of the liquid-cooled rotor with support portion (support portion with support portion recess). For the rest, reference is made to the explanations of the liquid-cooled rotor according to FIGS. 1 to 4, so that in the following mainly only the differences of the embodiments shown in FIG. 5 to these will be discussed.

In the embodiment of the liquid-cooled rotor 1 shown in FIG. 5a, the liquid guide tube 3f is received in a fluid-tight support portion 16a designed as a cover. This fluid-tight support portion 16a centers the liquid guide tube 3f with respect to the rotor shaft 2, and fluid-tightly closes the second axial end 3fII of the liquid guide tube 3f. In the illustrated embodiment, liquid is allowed to exit from the liquid guide tube 3f via the liquid outlet openings 3e. Shown is an embodiment in which the fluid-tight support portion 16a is attached to the liquid guide tube 3f as a separate component, but this can also be designed in one piece with the liquid guide tube 3f.

FIG. 5b shows an embodiment of the invention in which the support portion 16b is understood to have support portion recesses 16c. With these support portion recesses 16c, a liquid flow from the second axial end 3fII of the liquid guide tube 3f into the liquid annulus space 5 is made possible. Via the design of the support portion recess 16c or the plurality of support portion recesses, it is possible to constructively adjust the amount of liquid entering the liquid annulus space 5 in this way.

Figure 6:
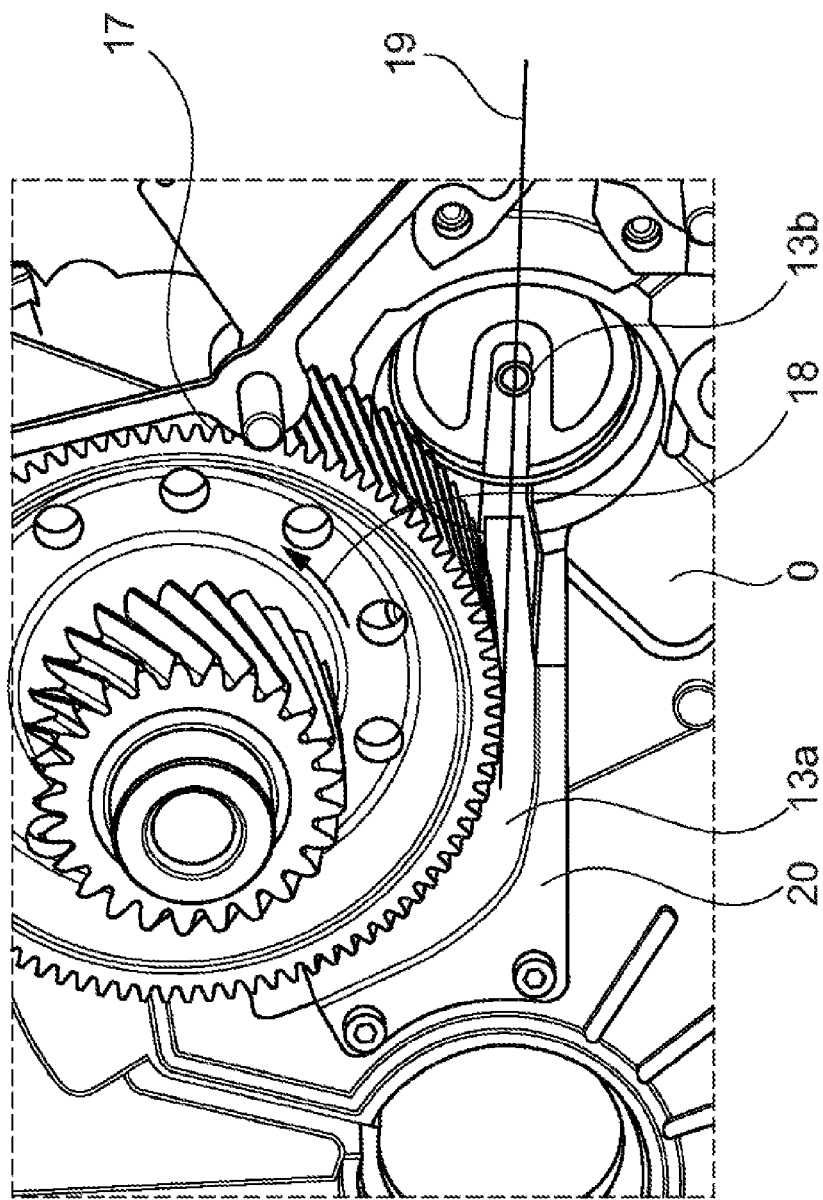
FIG. 6 shows a partial perspective view of the mating gear with preferred direction of rotation.

FIG. 6 shows a partial perspective view of the housing device 0 with the mating gear 17. The mating gear 17 meshes with the output pinion 12 (not shown) of the liquid-cooled rotor 1 (not shown) for power transmission. The mating gear 17 is surrounded here in the circumferential direction at least in portions by the liquid portion 13a.

In normal operation, the mating gear 17 rotates in the preferred direction of rotation 18, and the mating gear 17 is immersed in liquid which is collected in the liquid collection portion 13a. The liquid collection portion 13a is formed by the guide member 20 and the housing device 0. As a result of the rotational movement of the mating gear 17 in the preferred direction of rotation 18, liquid is conveyed from the liquid collection portion 13a in the direction of the tangent 19 to the mating gear 17 and thus to the liquid supply portion 13b.

In particular, because the mating gear 17 is partially surrounded by the liquid collection portion 13a in the radial direction, liquid is conveyed from the liquid collection portion 13a in the direction of the tangent 19 to the mating gear 17. In this case, the liquid collection portion 13a is arranged such that the tangent 19 in the liquid collection portion 13a extends in the direction of the first axial end of the liquid-guiding device (not shown). The liquid supply portion 13b projects into the liquid-guiding device (not shown) in the assembled state. Accordingly, in normal operation of an electromechanical energy converter having a liquid-cooled rotor as shown (FIGS. 1 to 5) in the preferred direction of rotation 18 of the mating gear 17, liquid is conveyed from the liquid collection portion 13a to the liquid inlet opening 3b, in particular for cooling the liquid-cooled rotor 1 in operation, and thus the liquid-cooled rotor 1 is cooled by a liquid without an additional pump.

Simply stated, the invention proposes two ways in which liquid, in particular transmission oil, can exit from the liquid collection portion, can enter the liquid-guiding device, and there can contribute in particular to the cooling of the liquid cooled rotor. On the one hand, it is possible that these effects are each used individually and, on the other hand, it is possible that these effects are used in combination. One usable effect is the weight force, the other usable effect is the conveying effect of a gear, in particular the mating gear. On the one hand, the liquid collection portion can thus be arranged geodetically above the liquid inlet opening, at least in portions, in the normal installation position of an electromechanical energy converter (weight force), on the other hand, the liquid collection portion can be arranged in such a way that a tangent in the liquid collection portion to the mating gear points in the direction of the liquid inlet opening (conveying effect of the mating gear).

LIST OF REFERENCE SIGNS 0 housing device
1 liquid-cooled rotor
2 rotor shaft
2a first open axial end of 2
2b rotor shaft end piece
3 liquid-guiding device
3a interior of 3
3b liquid inlet opening
3c first axial end of 3
3d second axial end of 3
3e liquid outlet opening of 3
3f liquid guide tube
3fI first axial end of 3f
3fII second axial end of 3f
3g output shaft component
3gI first axial end of 3g
3gII second axial end of 3g
4 radial direction
5 liquid annulus space
6 pipe connection region
6a centering region
6b torque transmission region
7 liquid-guiding channel
7a recess for 7
8 surrounding environment
9 rotor axis 10 axial direction
11 energy converter rotor
12 output pinion
13 liquid supply device
13a liquid collection portion
13b liquid supply portion
14 accumulation portion
14a accumulation portion ring
15 deep groove ball bearing
16a support portion liquid-tight
16b support portion with support portion recess
16c support portion recess
17 mating gear
18 preferred direction of rotation of 17
19 tangent to 17 in 13a
20 guide element for 13a

The invention claimed is:

1. A liquid-cooled rotor for an electromechanical energy converter, wherein the liquid-cooled rotor is mounted rotatably about a rotor axis, and wherein the liquid-cooled rotor comprises:
 a rotor shaft which is designed, at least in portions, as a hollow shaft and has a first, open axial end; and
 a liquid-guiding device which extends through the first, open axial end into the rotor shaft,
 wherein, in a radial direction, a liquid annulus space is formed between the liquid-guiding device and the rotor shaft, and
 wherein the liquid-guiding device has an interior for guiding liquid and a liquid inlet opening in the interior, wherein the liquid inlet opening is arranged at a first axial end of the liquid-guiding device, wherein the liquid-guiding device is accommodated in the rotor shaft indirectly or directly at a second axial end, which is opposite the first axial end of the liquid-guiding device, and is thus guided relative to the rotor shaft,
 wherein the liquid-guiding device has at least one liquid outlet opening through which the interior of the liquid-guiding device is fluidically connected to the liquid annulus space,
 wherein the liquid outlet opening is arranged in an axial direction between the first and second ends of the liquid-guiding device,
 wherein the liquid-guiding device has a liquid guide tube and an output shaft component,
 wherein the liquid inlet opening is arranged at a first axial end of the output shaft component and the liquid guide tube is arranged at a second axial end of the output shaft component, and the liquid guide tube is received with a first axial end at the output shaft component,
 wherein the at least one liquid outlet opening extends through a wall of the liquid guide tube,
 wherein the output shaft component is received in the rotor shaft in a rotor connection region,
 wherein, at least one liquid-guiding channel is arranged in the rotor connection region, by which the liquid annulus space is fluidically connected to an environment surrounding the liquid-cooled rotor
 wherein the connection region has a torque transmission region and a centering region,
 wherein the torque transmission region and the centering region are spaced apart from one another in the axial direction along the rotor axis, and
 wherein the liquid-guiding channel in the centering region is designed as a recess on the rotor shaft or on the output shaft component.

2. The liquid-cooled rotor according to claim 1, wherein the liquid guide tube is received with a second axial end of the liquid guide tube at the rotor shaft end piece.

3. An electromechanical energy converter comprising the liquid-cooled rotor according to claim 1,
 wherein the electromechanical energy converter is mounted rotatably in a housing device,
 wherein an energy converter rotor is connected to the rotor shaft for conjoint rotation,
 wherein an output pinion is arranged on the liquid-cooled rotor,
 wherein, in a normal installation position of the electromechanical energy converter, the output pinion meshes with a mating gear for power transmission, wherein the mating gear is surrounded, at least in portions in the radial direction, by a liquid collection portion of a liquid-supply device, and wherein the liquid collection portion is arranged such that at least one tangent to the mating gear in the liquid collection portion runs in a direction of the first axial end of the liquid-guiding device, and
 wherein, in normal operation in a direction of rotation of the mating gear, liquid is conveyed by the mating gear from the liquid collection portion to the liquid inlet opening.

4. The electromechanical energy converter according to claim 3, wherein a radially circumferential and radially inwardly projecting accumulation portion is formed at the liquid inlet opening.

5. The electromechanical energy converter according to claim 3,
 wherein the liquid supply device has a liquid supply portion, and
 wherein the liquid supply portion is designed as a raised portion on the liquid supply device and extends in the axial direction through the liquid inlet opening into the liquid-guiding device.

6. The electromechanical energy converter according to claim 5, wherein the liquid supply portion extends in the axial direction beyond the accumulation portion into the interior of the liquid-guiding device.

7. An electromechanical energy converter comprising:
 a liquid-cooled rotor for an electromechanical energy converter, wherein the liquid-cooled rotor is mounted rotatably about a rotor axis, and wherein the liquid-cooled rotor comprises:
 a rotor shaft which is designed, at least in portions, as a hollow shaft and has a first, open axial end; and
 a liquid-guiding device which extends through the first, open axial end into the rotor shaft,
 wherein, in a radial direction, a liquid annulus space is formed between the liquid-guiding device and the rotor shaft, and
 wherein the liquid-guiding device has an interior for guiding liquid and a liquid inlet opening in the interior, wherein the liquid inlet opening is arranged at a first axial end of the liquid-guiding device, wherein the liquid-guiding device is accommodated in the rotor shaft indirectly or directly at a second axial end, which is opposite the first axial end of the liquid-guiding device, and is thus guided relative to the rotor shaft,
 wherein the liquid-guiding device has at least one liquid outlet opening through which the interior of the liquid-guiding device is fluidically connected to the liquid annulus space, and wherein the liquid outlet opening is arranged in an axial direction between the first and second ends of the liquid-guiding device, wherein the electromechanical energy converter is mounted rotatably in a housing device, wherein an energy converter rotor is connected to the rotor shaft for conjoint rotation, wherein an output pinion is arranged on the liquid-cooled rotor, wherein, in a normal installation position of the electromechanical energy converter, the output pinion meshes with a mating gear for power transmission, wherein the mating gear is surrounded, at least in portions in the radial direction, by a liquid collection portion of a liquid-supply device, and wherein the liquid collection portion is arranged such that at least one tangent to the mating gear in the liquid collection portion runs in a direction of the first axial end of the liquid-guiding device, and wherein, in normal operation in a direction of rotation of the mating gear, liquid is conveyed by the mating gear from the liquid collection portion to the liquid inlet opening.

8. The electromechanical energy converter according to claim 7, wherein a radially circumferential and radially inwardly projecting accumulation portion is formed at the liquid inlet opening.

9. The electromechanical energy converter according to claim 7, wherein the liquid supply device has a liquid supply portion, and wherein the liquid supply portion is designed as a raised portion on the liquid supply device and extends in the axial direction through the liquid inlet opening into the liquid-guiding device.

10. The electromechanical energy converter according to claim 9, wherein the liquid supply portion extends in the axial direction beyond the accumulation portion into the interior of the liquid-guiding device.

* * * * *